March 11, 1969    R. M. PETERSON    3,431,767
METHOD FOR MAKING DIES
Filed June 24, 1966

INVENTOR
R. M. PETERSON
BY

ATTORNEY

United States Patent Office 3,431,767
Patented Mar. 11, 1969

3,431,767
METHOD FOR MAKING DIES
Roswald M. Peterson, 85 Weston Ave.,
Chatham, N.J. 07928
Filed June 24, 1966, Ser. No. 560,333
U.S. Cl. 72—327                     1 Claim
Int. Cl. B21d 31/02

ABSTRACT OF THE DISCLOSURE

A floating punch to be removably mounted in a punch press is made by machining a die member to the desired configuration, mounting a peening tool in the ram of a high reciprocating frequency punch press, abutting a vertical surface of the die against a stop which is displaced from the axial path of the peening tool by a distance that is small with respect to the major dimensions of the die member, causing the peening tool to reciprocate and to repeatedly peen at a high frequency the upper surface of the die member, thereby deforming the upper surface at its periphery, and maintaining the vertical surface of the die member in abutment with the stop while sliding the vertical surface past the stop and rotating the die member through one rotation at an appropriate rate to cause successive deformations to overlap, thereby forming a continuous flange along the die member periphery at its upper surface.

---

This invention relates to die making methods, and more particularly, to methods for making peripheral flanges for die heads on the upper parts of floating dies.

A die press or punch press typically comprises an upper die member or punch mounted on a vertically movable ram and aligned with an aperture of a lower die plate mounted on a base of the die press. A workpiece overlaying the lower die plate aperture is sheared or deformed, as the case may be, when the upper die is forceably projected through the aperture. So-called "floating punch" upper die members are sometimes mounted on the ram by a "punch plate" having an aperture conforming to the outer periphery of the upper die member. The upper die member extends through the aperture and is held against the ram by a peripheral flange or enlarged head portion that is contained between punch plate and ram.

It is customary to machine the peripheral flange or enlarged head portion during the fabrication of the upper die member, and then to heat treat the die member to strengthen it. It became apparent to me that the fabrication of floating punches would be greatly simplified if the peripheral flange did not have to be made during the machining operation because the die could then be cut with straight parallel sides. This would be particularly valuable for "small lot" stamping operations in which new dies must be made and replaced fairly frequently. However, separate fabrication of die head portions to be welded or otherwise bonded on the die member would be time consuming and impractical. It would also be impractical to form a peripheral flange by upsetting the entire upper portion of a die member because of the expense and complexity of providing a machine capable of upsetting any but the smallest die members.

Accordingly, it is an object of this invention to simplify the formation of peripheral flanges on upper die members of the type known as floating punches.

These and other objects of the invention are attained by an illustrative technique for forming a flange on an upper surface of a die member which has been machined to a desired die configuration without the inclusion of a head portion or an upper peripheral flange. In accordance with my technique, the peripheral flange is made by repeatedly striking the upper surface of the die with a sharp peening tool along a path that is in close proximity to the outer periphery of the die. The repeated blows of the peening tool deform the upper surface of the die to make it bulge at its periphery thereby forming the desired peripheral flange. After the flange has been formed, the entire die including the flange is heat treated to enhance its structural strength.

In accordance with a particular feature of the invention, the peening tool is vertically mounted in a high speed press which periodically drives it downwardly at a relatively high frequency. The die is located beneath the peening tool and is abutted against a cylindrical stop that is displaced a slight distance from the axial path of the peening tool so that the tool strikes the die near its periphery as described above. The die is then manually rotated with one side in constant abutment against the stop. During rotation, the progressive deformation of the upper surface of the die traces a path that is an appropriate distance from the die periphery to form the desired flange. With this provision, a flange of uniform and accurate predetermined dimension can be fashioned quickly and conveniently by a relatively unskilled operator. It has further been found that after the die has been tempered, the structural strength of the flange approximates that of a conventional machined flange.

These and other objects, features, and advantages will be better understood from a consideration of the following detailed description taken in conjunction with the accompanying drawing in which.

Figure 1:
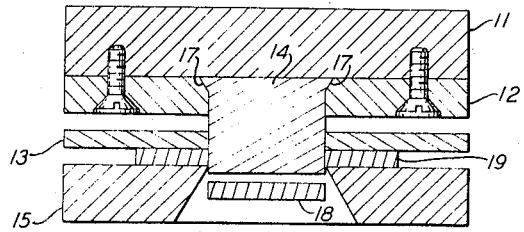
FIG. 1 is a schematic illustration of part of a die press having an upper die made in accordance with the present invention.

Referring now to FIG. 1, there is shown schematically part of a die press comprising a ram backup plate 11, a punch plate 12, a stripper plate 13, an upper die member 14, and a lower die member 15. The upper die member 14 extends through a close fitting aperture in the punch plate which is bolted or otherwise securely fastened to the backup plate 11. The upper die member is retained within the punch plate aperture by a head portion defined by a peripheral flange 16. When the die press is operated, the upper die 14 is forceably projected through apertures in the stripper plate 13 and the die plate 15 both of which have substantially the same configuration as the periphery of the upper die member 14. In so doing, a portion 18 is sheared from a workpiece 19. As the ram is withdrawn vertically, the stripper plate 13 dislodges the workpiece 19 from the upper die member 14 to prevent it from remaining impaled on the upper die member.

Figure 2:
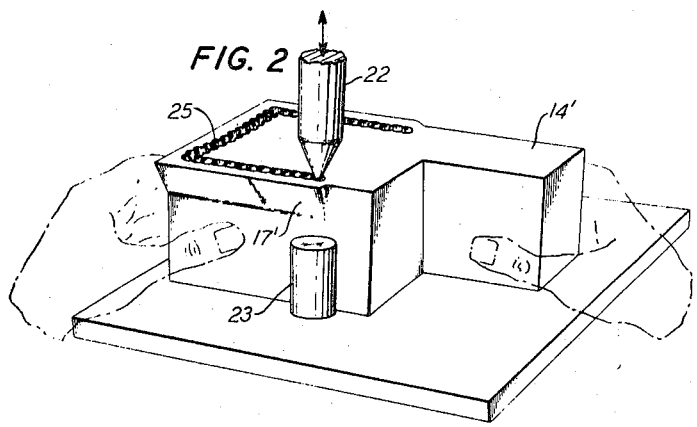
FIG. 2 is a schematic illustration of a technique for making a peripheral flange on a die in accordance with the present invention.

The upper die member 14 is of a type known in the art as a floating punch, and is particularly favored for small lot stamping operations because it is relatively easy to replace with dies of different configuration. As was mentioned before, the difficulties associated with machining a peripheral flange on dies of this type has heretofore constituted a serious drawback of the floating punch. In accordance with the invention, this drawback is largely alleviated by the method and apparatus shown in FIG. 2. A partially completed die member 14' of FIG. 2 is initially made without any peripheral flange; it is machined only to define the desired die pattern. It is then placed on a base 21 beneath a peening tool 22 in firm abutment against a cylindrical stop 23. Stop 23 is displaced from the axis of the peening tool 22 as is best shown in the enlarged side view of FIG. 3.

The peening tool 22 is mounted in a high speed punch press which causes it to reciprocate at a relatively high frequency as shown by the arrow of FIG. 2. At each reciprocation, the peening tool penetrates the die 14' to a distance $d_2$ shown in FIG. 3 which deforms the periphery of the upper surface of the die to form a flange portion 17'. As the peening tool reciprocates, the operator rotates the die 14' while keeping one side of the die firmly abutted against stop 23. The successive penetrations of the peening tool form a track 25 in the upper surface of the die member which aids the operator in moving the die 14' at a uniform rate to progressively fashion a uniform peripheral flange. After the die 14' has been moved through one complete rotation, the flange forming operation is completed and a continuous peripheral flange 17 is described on the die 14 as shown in FIG. 4. After formation of the flange, the die 14 is heat treated to strengthen it as is conventional in the art.

It can be appreciated that my method for fashioning peripheral flanges considerably facilitates the fabrication of upper die members, and particularly die members of the type known as floating punches. The position of cylindrical stop 23 indicated by distance $d_1$ of FIG. 3, the penetration depth of the peening tool $d_2$, and the frequency of reciprocation of the peening tool can be very accurately set prior to operation on uncompleted dies, so that very little skill by the operator is required. The precise values which are used may vary, depending upon the dimensions of the die and the material from which it is made. I have found that for making a peripheral flange on a die of cold rolled steel, it is convenient to use a peening tool 22 having sides that are tapered at 30 degrees to a point 24 that is .030 inch wide, as shown in FIG. 3, with a displacement $d_1$ of 1/16 inch, a penetration depth $d_2$ of .015–.035 inch, and a reciprocating frequency of 10 cycles per second.

Figure 3:
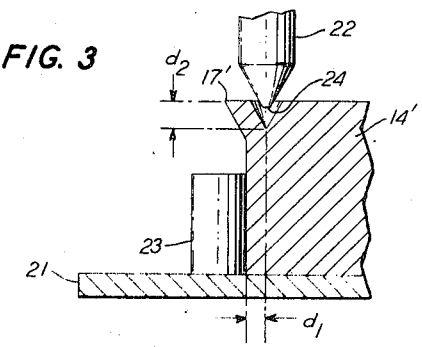
FIG. 3 is an enlarged side view of part of the apparatus of FIG. 2.
Figure 4:
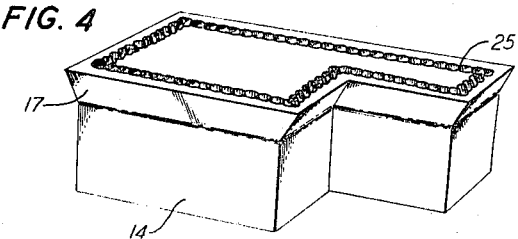
FIG. 4 is a perspective view of a die made in accordance with the invention.

The apparatus shown in FIGS. 2 and 3 accurately positions the die so that when it is rotated, any point on the periphery of the die describes a path that conforms with the configuration of the die periphery. Other apparatus could be designed for guiding the die; however, the use of a cylindrical stop as shown is convenient, accurate, and is preferred for implementing the invention. Various other modifications and embodiments may be made without departing from the spirit and scope of the invention.

What is claimed is:

1. The method of making a floating punch to be movably mounted in a punch press ram structure to shear or deform workpieces into a prescribed configuration comprising the steps of:

machining a die member such that it comprises a continuous vertical surface defining said prescribed configuration and opposed upper and lower horizontal surfaces;

mounting a peening tool in the ram of a high reciprocating frequency punch press;

abutting the vertical surface of the die against a stop, the stop being displaced on the axial path of the peening tool by a distance that is small with respect to the major dimensions of the horizontal surfaces;

causing the peening tool to reciprocate and to repeatedly peen at a high frequency the upper surface, thereby deforming the upper surface at its periphery;

and maintaining the vertical surface of the die in abutment with the stop while sliding the vertical surface past the stop and rotating the die through one rotation at an appropriate rate to cause successive deformations of the upper surface to overlap, thereby forming a continuous flange along the die member periphery at its upper surface.

References Cited

UNITED STATES PATENTS

| 2,881,646 | 4/1959 | Farr et al. | 29—243.5 |
| 3,151,504 | 10/1964 | Pare et al. | 76—107 |
| 3,327,569 | 6/1967 | Prutton | 76—107 |

RONALD D. GREFER, *Primary Examiner.*

E. M. COMBS, *Assistant Examiner*

U.S. Cl. X.R.

29—243.5; 76—107